J. L. WILSON.
WELL CLEANER.
APPLICATION FILED APR. 14, 1914.
1,140,225.
Patented May 18, 1915.
2 SHEETS—SHEET 1.
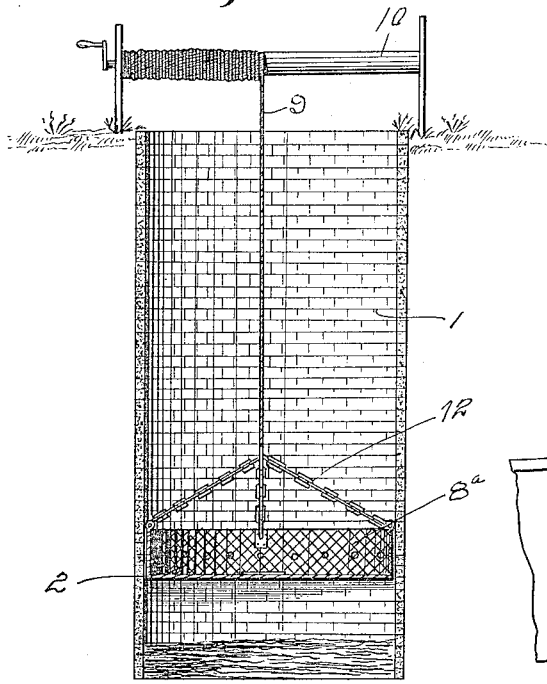
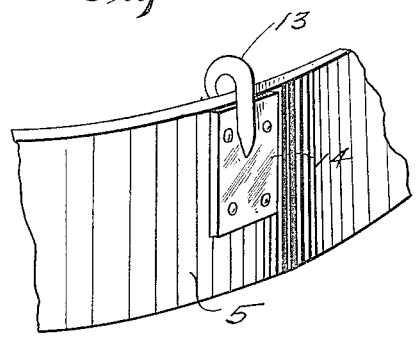
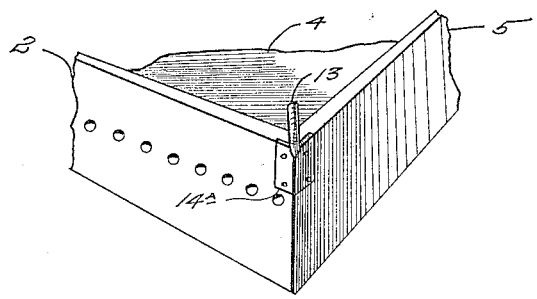
Witnesses
Inventor
J. L. Wilson,
By
Attorney J. L. WILSON.
WELL CLEANER.
APPLICATION FILED APR. 14, 1914.
1,140,225.
Patented May 18, 1915.
2 SHEETS—SHEET 2.
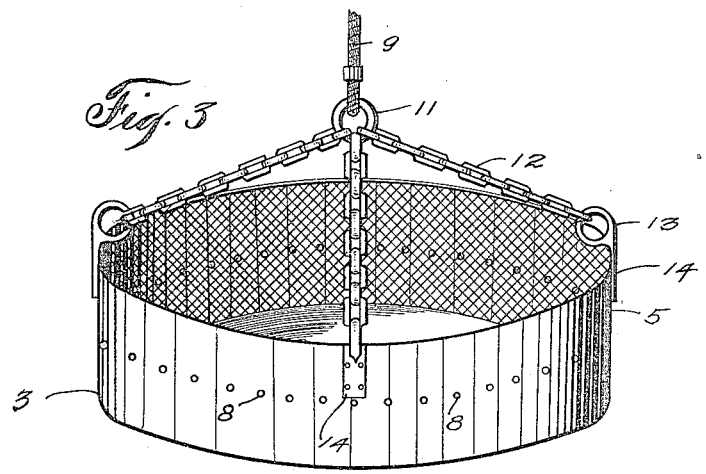
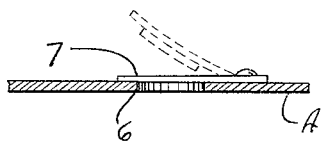
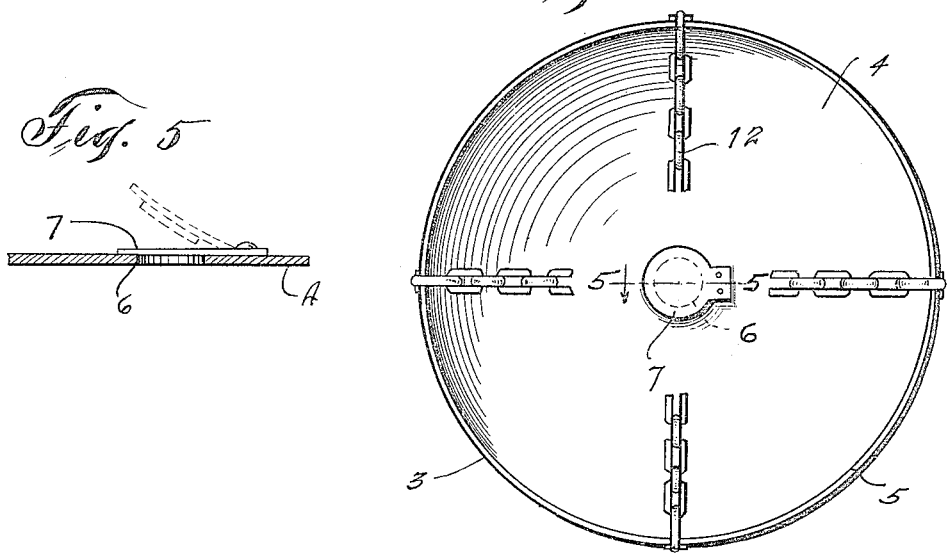
Inventor
J. L. Wilson,

UNITED STATES PATENT OFFICE.

JEREMIAH L. WILSON, OF SPREAD, GEORGIA.

WELL-CLEANER.

1,140,225.  Specification of Letters Patent.  Patented May 18, 1915.

Application filed April 14, 1914. Serial No. 831,796.

*To all whom it may concern:*

Be it known that I, JEREMIAH L. WILSON, a citizen of the United States, residing at Spread, in the county of Jefferson and State of Georgia, have invented certain new and useful Improvements in Well-Cleaners; and I do hereby declare the following to be a full, clear, and exact description of the invention, such as will enable others skilled in the art to which it appertains to make and use the same.

My invention is directed to improvements in wells, and one of its objects is the provision of a pan which shall have a cross sectional area about equal to that of the well and which shall normally rest upon the bottom of the well so as to catch and retain all foreign matter that may drop into or form in the well.

Another object of the invention is the provision of means by which the pan may be readily and quickly withdrawn when it is desired to clean the well.

A further object of the invention is the provision of a well cleaning pan which shall be simple, durable and efficient and which may be manufactured and sold at a comparatively low cost.

With the above and other objects in view, the invention consists in the construction, combination and arrangement of parts hereinafter fully described and claimed and illustrated in the accompanying drawings, wherein, Figure 1 is a vertical sectional view of a well illustrating the manner in which the pan may be lowered thereinto; Fig. 2 is a perspective view of a fragmentary portion of a rectangular pan; Fig. 3 is a perspective view of a cylindrical pan; Fig. 4 is a top plan view of the cylindrical pan; Fig. 5 is a sectional view taken on the line 5—5 of Fig. 4 looking in the direction indicated by the arrow, and, Fig. 6 is a perspective view of a fragmentary portion of the side wall of the cylindrical pan.

Referring to the drawings by reference numerals, 1 designates a rectangular well of the usual construction.

My improved well cleaner comprises a rectangular pan 2, as shown in Figs. 1 and 2 of the drawings, or a cylindrical pan 3, as shown in Figs. 3 and 4 of the drawings, the configuration of the pan depending wholly upon the cross sectional formation of the well. The pan is shallow and comprises a bottom wall 4 and a side wall 5. The bottom wall 4, as shown in Figs. 4 and 5 of the drawings, is provided with a central opening 6 to permit the pan to be placed upon the bottom of the well, the water passing up through the opening during the operation of the lowering of the pan into the well.

The opening 6 is controlled by an upwardly opening valve 7, which prevents water passing through the opening during the operation of removing the pan from the well. At a suitable point above the bottom 4, the side wall 5 is provided with a plurality of small openings 8, all of which are arranged in the same horizontal plane. The openings 8 permit of the ready removal of the pan from the well, and permit all the water in the pan above them to drain back into the well when the pan is lifted above the water. The size of the openings 8, and their location above the bottom 4 prevents foreign matter that has accumulated in the pan from draining back into the well during the operation of removing the pan.

As shown in Figs. 1 and 3 of the drawings, the pan may be provided with an annular screen 8ª to prevent foreign matter passing back into the well through the openings 8. The screen may be secured in the pan against the inner face of the side wall 5 by means of rivets or other suitable fastenings, not shown.

The means by which the pan may be removed from the well comprises a cable 9 having its upper end attached to a drum 10 or other suitable hoisting mechanism. A ring 11 is secured to the lower end of the cable 9 and has attached thereto the upper ends of a series of chains 12. The lower ends of the chains 12 are secured to eyes 13 that are carried by the upper ends of plates 14 riveted to the side wall 5. In the angular form of the pan the plates 14 are utilized to reinforce the connections between the side walls, as shown in Fig. 2 of the drawings. By reference to this figure, it will be seen that the plate 14ª is of angular formation and embraces the corner formed by the meeting of two of the side walls, the plate being firmly bolted to both walls.

Having thus fully described my invention, what I desire to secure by Letters-Patent is:—

A well cleaner consisting of a pan having a cross sectional area about equal to that of the well and normally resting upon the bottom of the well, said pan comprising a bottom wall and a side wall and being fully open on its upper side, said bottom wall being provided with a single opening to permit the pan to be lowered into the well, an upwardly opening valve controlling said opening to prevent water leaving the pan through said opening during the removal of the pan from the well, said side wall being provided with a single horizontal row of openings located therein at a point above the bottom wall, a screen secured to the inner face of the side wall over the openings therein, and means by which the pan may be lowered into or withdrawn from the well.

In testimony whereof I affix my signature in presence of two witnesses.

JEREMIAH L. WILSON.

Witnesses:
J. E. B. JONES,
S. J. DICKSON.